United States Patent
Jordan et al.

(10) Patent No.: US 7,468,806 B2
(45) Date of Patent: Dec. 23, 2008

(54) SYSTEM AND METHOD FOR SELECTIVE IMAGE ACQUISITION

(75) Inventors: Andrew Leighton Jordan, Harpenden (GB); Thomas Edward Chase, Welwyn Garden City (GB)

(73) Assignee: Xerox Corporation, Norwalk, CT (US)

( * ) Notice: Subject to any disclaimer, the term of this patent is extended or adjusted under 35 U.S.C. 154(b) by 588 days.

(21) Appl. No.: 11/314,562

(22) Filed: Dec. 21, 2005

(65) Prior Publication Data
US 2007/0139722 A1    Jun. 21, 2007

(51) Int. Cl.
G06F 15/00 (2006.01)
G06K 1/00 (2006.01)
H04N 1/387 (2006.01)

(52) U.S. Cl. .................................... 358/1.18; 358/453
(58) Field of Classification Search .................. 358/1.1, 358/1.2, 1.6, 1.18, 505, 537, 538, 452, 453
See application file for complete search history.

(56) References Cited
U.S. PATENT DOCUMENTS

| | | | |
|---|---|---|---|
| 4,558,374 A | 12/1985 | Kurata et al. | |
| 4,965,744 A * | 10/1990 | Wagatsuma et al. | 358/1.9 |
| 4,987,497 A | 1/1991 | Yoshimura | |
| 5,224,181 A | 6/1993 | Tsutsumi | |
| 5,274,468 A | 12/1993 | Ojha | |
| 6,697,091 B1 | 2/2004 | Rzepkowski et al. | |
| 6,910,184 B1 * | 6/2005 | Yano et al. | 715/201 |
| 2004/0255242 A1 | 12/2004 | Price et al. | |
| 2005/0073695 A1 | 4/2005 | Nacman et al. | |

OTHER PUBLICATIONS

European Search Report.

* cited by examiner

*Primary Examiner*—Douglas Q Tran
(74) *Attorney, Agent, or Firm*—Fay Sharpe LLP

(57) ABSTRACT

A method selectively acquiring one or more images from a hardcopy document is provided. The method includes demarking boundaries on one or more hardcopy pages using a writing instrument to differentiate a selected image portion from a non-selected image portion, scanning the one or more demarked hardcopy pages with an image acquisition device, acquiring one or more images from the hardcopy pages, and processing the acquired one or more images from the selected image portion to differentiate them from the non-selected image portion.

19 Claims, 6 Drawing Sheets

SYSTEM AND METHOD FOR SELECTIVE IMAGE ACQUISITION

BACKGROUND

The embodiments described herein relate generally to image acquisition machines such as copiers and/or printers and, more particularly, to a system and method for selectively acquiring images from a hardcopy document.

Image acquisition machines acquire images from hardcopy documents in an image acquisition process also known as scanning. These machines can be scanners, copiers, multifunction machines, or other known devices capable of acquiring images from hardcopy pages. The acquired images can then be reproduced or printed in hardcopy form, such as in copying, or saved in an electronic form for later processing and/or printing.

Image acquisition machines typically have an image capturing device, also referred to as an image acquisition or image forming device, which acquires the image from the hardcopy document. Various known sensors can be used by the image acquisition device to capture the image from the hardcopy page. A charge coupled device (CCD) is one example of an image capturing device sensor commonly used in image acquisition machines such as scanners. A CCD is a small light-sensitive diode which converts photons of light into an electrical charge. The brighter the light that hits each single CCD element, the greater the electrical charge that the particular element generates. Typically, a plurality of CCD devices are arranged in an array, and the hardcopy document is illuminated and passed over the array, or the array is passed over the document, to acquire the image or images from the hardcopy document and convert them into an electronic form. Flatbed scanners, also called desktop scanners, sheet-fed scanners, and even handheld scanners use CCD devices to acquire images from hardcopy documents. Other sensors such as contact image sensors, photomultiplier tubes, other photoreceptors, or other known devices can also be used.

Typically, the entire page of the hardcopy document is scanned so that all of the image portion of the document is acquired. However, this can present a problem when a user wants to acquire less than all of the image or images on the hardcopy page. People often resort to covering portions of the hardcopy page with an opaque material, such as paper, to prevent the covered image(s) from being acquired, or cutting away portions from the original hardcopy document with scissors to remove image portions that they don't want acquired when the document is scanned. All of these methods impose undesired complexity and burden. It is, therefore, desirable to provide in improved system and method of selectively acquiring images from a hardcopy document using an image acquisition machine.

BRIEF DESCRIPTION

In one aspect of the presently described embodiments, there is provided a method of selectively acquiring images from a hardcopy document. The method includes demarking boundaries on one or more hardcopy pages using a writing instrument to differentiate a selected image portion from a non-selected image portion, scanning the one or more demarked hardcopy pages with an image acquisition device, acquiring one or more images from the hardcopy pages, and processing the acquired one or more images from the selected image portion to differentiate them from the non-selected image portion.

In another aspect of the presently described embodiments, an image acquisition machine is provided for selectively acquiring images from a selected image portion and processing them in a manner which differentiates them from images in a non-selected image portion of the hardcopy document. The image acquisition machine includes an image acquisition portion for acquiring one or more images from a hardcopy document page including a selected image portion, a non-selected image portion and boundaries demarked on the hardcopy document page. The image acquisition machine also includes a controller for determining the extent of the demarked boundaries and differentiating between the selected image portion and a non-selected image portion using the demarked boundaries, the controller processing the selected image portion differently than the non-selected image portion.

BRIEF DESCRIPTION OF THE DRAWINGS

The foregoing and other features of the exemplary embodiment will be apparent and easily understood from a further reading of the specification, claims, and by reference to the accompanying drawings in which:

DETAILED DESCRIPTION

Figure 1:
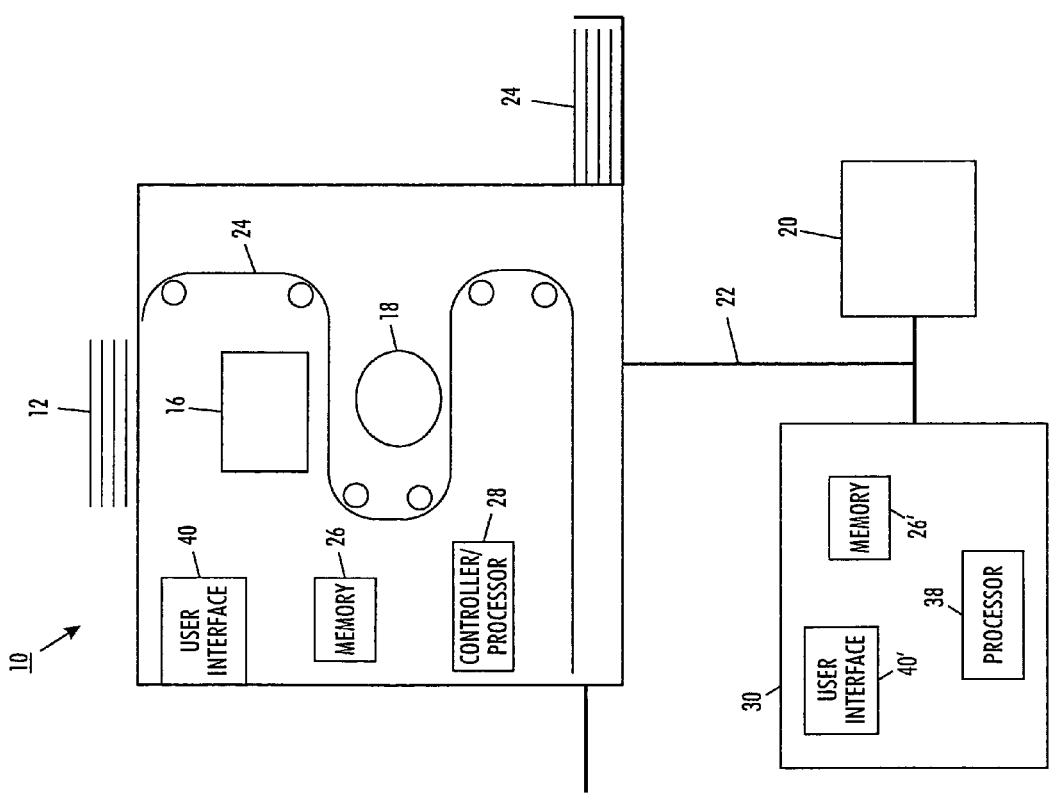
FIG. 1 is a diagrammatic view of an image acquisition machine providing selective image acquisition.

The present application is directed to a system and method for providing selective image acquisition from hardcopy documents. Referring now to the drawings, FIG. 1 is a schematic depiction of the various components of an example of an image acquisition machine 10 suitable for selectively acquiring images from hardcopy documents 12. The image acquisition machine 10 can be a scanner, copy machine, such as a xerographic or electrophotographic copy machine, among others, multifunction machine, or other image acquisition machine capable of capturing images from hardcopy documents, storing them and processing them as described in further detail below. The hardcopy document 12 can be one or more sheets of paper or other substrate pages having one or more images. The images can include pictures, text, graphics, or any other form of visual representation formed on the page or pages of hardcopy document. A newspaper page is used for the purposes of example in the description provided below, however it should be appreciated that this should not be considered limiting and the method and/or apparatus described herein is applicable to other hardcopy documents.

The image acquisition machine 10 includes an image acquisition portion 16 for acquiring images from hardcopy documents 12, such as for example, a CCD array, a photoconductive member, or photoreceptor, or other known image capturing devices suitable for acquiring an image from a hardcopy document. The image acquisition machine 10 can also include a printing device 18 for printing images on hardcopy pages, also referred to as sheets. An example of the printing device 18 can include portions of a xerographic copying machine which are known in the art, though other printing devices including an external printer 20 can be used. The external printer 20 can be connected to the image acquisition machine 10 via a network connection 22 or a direct hardwired connection, or in other suitable manners as is known in the art.

The image acquisition machine 10 can also include a paper supply and transport assembly 24 for moving sheets of paper through the machine to acquire images therefrom and/or for forming images thereon. A controller 28 controls the operation of the machine 10, including the operation of the paper transport assembly, the image forming device and the printing device, if included, as well as performing many of the other functions described below including processing images. The controller 28 can be a microprocessor or one of other known computing and control device. The image acquisition machine 10 can include memory 26 for storing images in electronic form. The images can also be sent to an external device, such as a personal computer 30, connected to the image acquisition machine 10 via the network connection 22, and having a computing device 38 for processing the images and memory 26' for storing them.

The image acquisition machine 10 can include a User Interface 40 which enables the user to program and/or direct the machine to provide the desired functionality including initiating and directing the selective acquisition of images from hardcopy documents as described herein. The User Interface 40 can include hardbuttons, a Graphic User Interface, or some combination thereof. The User Interface 40 can be a remote User Interface 40' provided by another machine, such as the personal computer 30, for programming and directing the image acquisition machine 10 remotely.

Figure 2:
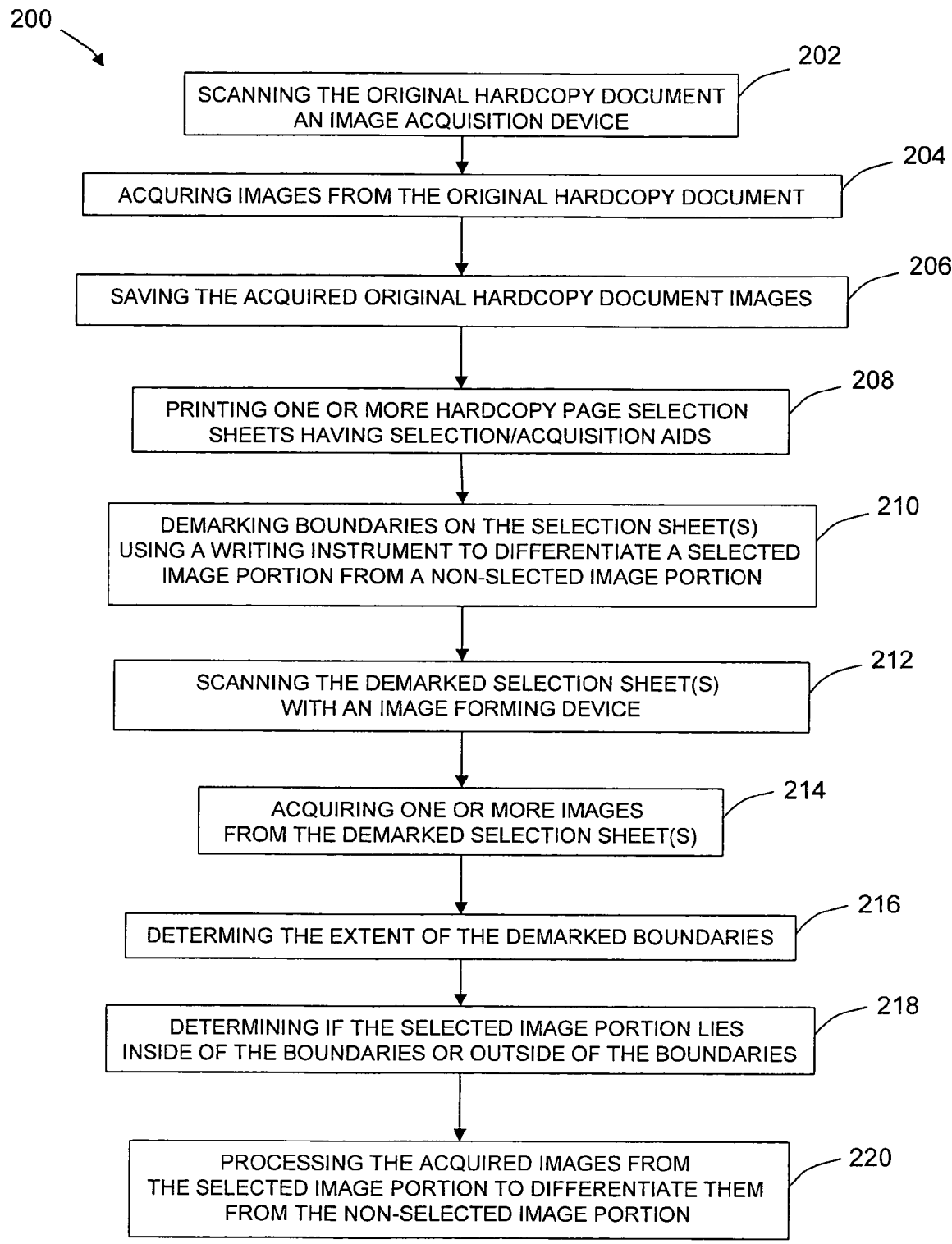
FIG. 2 is a flow chart illustrating a method for selectively acquiring images from a hardcopy document.
Figure 3:
FIG. 3 is a diagrammatic view of an original hardcopy document having images.

Referring now to FIGS. 2 and 3, a method of selectively acquiring one or more images from a hardcopy document shall now be described as shown generally at 200. The user can load an original hardcopy document 300 having one or more images 302 that the user wants to have selectively acquired and processed into the image acquisition machine 10. The user can select a "selective acquisition" option in the GUI or using hardbuttons, etc. to indicate that the process for selectively acquiring images is desired. The selective acquisition operation is then initiated, such as by pressing a start button. The original hardcopy document 300 is scanned by the image acquisition machine 10 at 202 and the document's images 302 are acquired by the image forming portion 16 at 204. The acquired images are then stored in memory 26 at 206. The images 302 can be stored in the machine's memory 26 or in the memory of a separate computer 30 connected to the image acquisition machine 10 via a network connection 22.

Figure 4:
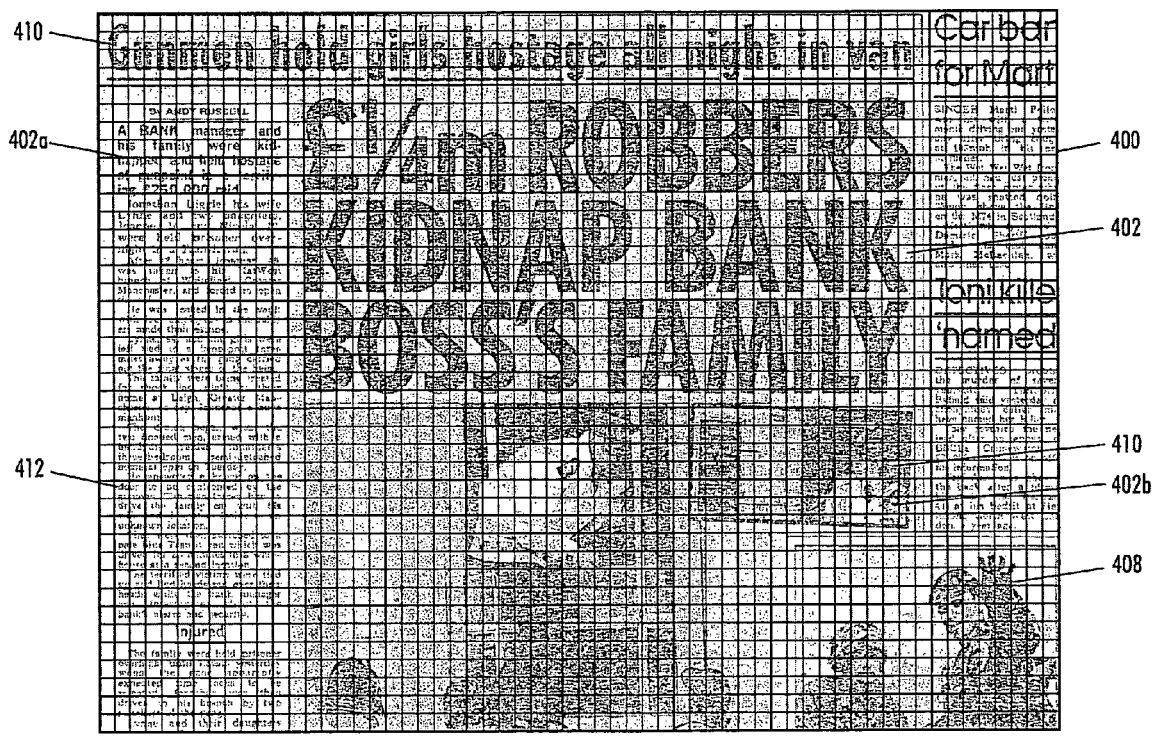
FIG. 4 is a diagrammatic view of a hardcopy document page having the images of the original hardcopy document and selection/acquisition aids.

Referring now to FIGS. 2 and 4, the image acquisition machine 10 then prints out the original document's images 302 on one or more hardcopy page selection sheets, one of which is shown at 400 in FIG. 4, at 208. The hardcopy page selection sheets 400 include one or more images 402 from the original hardcopy document which were acquired in the acquiring step at 204 above. These images 402 can include text 402a and/or pictures 402b, or other images. In one example, which should not be considered limiting, all of the images 302 from the original hardcopy document 300 are reproduced on the selection sheet(s) 400, such that each page of the hardcopy document 300 has a corresponding selection sheet page. The selection sheet(s) 400 can include selection/acquisition aids 406 which assist in the selection of one or more images, referred to herein as the selected image portion 410, the acquisition of these selected images and the processing of these images as described in further detail below. The selection aids 406 can include the images 402 having an altered image quality, such as by increasing their brightness and/or decreasing their contrast levels, as compared to the corresponding images 302 of the original hardcopy document 300. The selection aids 406 can also include gridlines 408 superimposed over the images 402.

Figure 5:
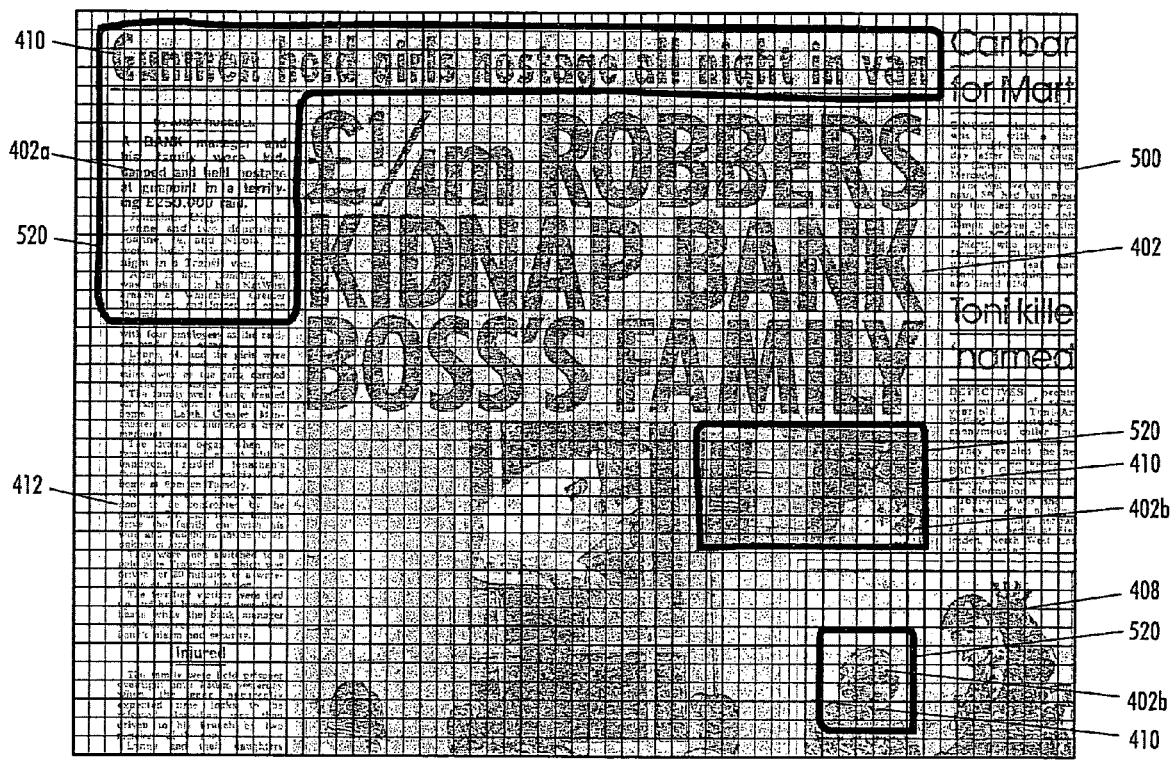
FIG. 5 is a diagrammatic view of a hardcopy document page having demarked boundaries used for differentiating a selected image portion and a non-selected image portion.

Referring now to FIGS. 2 and 5, the method 200 also includes demarking boundaries 520 on the one or more hardcopy page selection sheets 400 at 210, creating demarked hardcopy selection sheets 500, to differentiate a selected image portion 410 from a non-selected image portion 412. The boundaries 520 are demarked by marking the boundaries on the hardcopy page selection sheet(s) 400 with a writing instrument such as an ink pen, marker, or other marking device capable of producing boundary indicia including but not limited to lines, brackets, circles, rectangles, etc on a hardcopy page 400. The selected image portion 410 can be encompassed by the boundaries 520, such that it is inside the boundaries. In this instance, the non-selected image portion 412 will be outside the boundaries 520. Alternatively, the boundaries 520 can encompass the non-selected image portion 412 such that the selected image portion 410 lies outside of the boundaries.

The method 200 also includes scanning the demarked selection sheets 500 with the image acquisition machine 10 at 212. The demarked selection sheets are fed into the image acquisition machine 10 and scanned. The images 402 on the selection sheets are acquired at 214, including the boundaries 520.

The acquired image or images 402, 402a and 402b, and the boundaries 520 are then processed by image processing software in the controller to determine the extent of the demarked boundaries 520 at 216. The boundaries 520 can be made to be darker than the darkest portion of the images 402 on the selection sheet(s), using a suitable writing instrument, to facilitate in this determination. Further, the selection sheet selection/acquisition aids can also help in this regard, such as by having the images printed with an increased brightness and/or decreased contrast, as compared to the images of the original hardcopy document, as shown in FIGS. 4 and 5. Further, the superimposed gridlines can also be used for determining the extent of the boundaries, as well.

The controller 28 then determines if the selected image portion 410 lies inside of the boundaries 520 or outside of the boundaries. This information can be provided by the user via the User Interface 40 when supplying the operating conditions for the selective acquisition application they wish to run, or it can be determined internally by the application software run by the controller 28, such as pre-programmed operating conditions, which may for example be used by default. In the example provided herein, which should not be considered limiting, the user has indicated via the User Interface 40 that all images determined to lie within the demarked boundaries are to be considered as the selected image portions, and any images lying outside of the boundaries are to be considered as non-selected image portions.

Figure 6:
FIG. 6 is a diagrammatic view of a printed hardcopy document page having only selected image portion images.

The controller then processes the acquired images from the selected image portion 410 thereby differentiating them from the non-selected image portion 412. For example, the selected image portion images 410 can be retained while the images in the non-selected image portion 412 are discarded. The retained images 410 constituting the selected image portion can then be output in any suitable known manner, such as by saving them, printing them, emailing them, converting them to an OCR format, or processing them in any other suitable manner apart from the non-selected image portion images. In one example, the selected image portion is printed as shown in FIG. 6. The selected image portion 410 includes text 602a and photos 602b. This can complete the selective image acquisition process, or the selected image portion 410 can be processed further in any suitable known manner.

It should also be appreciated that a hardcopy document sheet having one or more images can be used in place of the selection sheet in step 210. The boundaries 520 can be demarked directly on the hardcopy document page or pages in step 210 to provide the boundaries used to differentiate the selected image portion from the non-selected image portion. The demarked hardcopy document page(s) can then be scanned in step 212, the images from the hardcopy document including the boundaries are then acquired at 214. The extent of the demarked boundaries are then determined in step 214.

As described above, known image processing techniques can be used to determine the extent of the demarked boundaries. After it is determined if the selected image portion lies inside or outside of the boundaries at 218, the selected image portion images are processed and/or output at 220 thereby differentiating them from the non-selected image portion in a manner similar to that described above.

While particular embodiments have been described, alternatives, modifications, variations, improvements and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. A method of selectively acquiring one or more images from a hardcopy document comprising:
   demarking boundaries on one or more hardcopy pages using a writing instrument to differentiate a selected image portion from a non-selected image portion;
   scanning the one or more demarked hardcopy pages with an image acquisition device;
   acquiring one or more images from the selected image portion; and
   processing the acquired one or more images from the selected image portion to differentiate them from the non-selected image portion.

2. The method defined in claim 1, further comprising outputting at least some of the processed images of the selected image portion separately from non-selected image portion.

3. The method defined in claim 2, wherein the outputting step includes at least one of printing, faxing, e-mailing, saving to a file, and converting to an Optical Character Recognition (OCR) file, the at least some of the processed images of the selected image portion.

4. The method defined in claim 1, further comprising outputting at least some of the processed images from the selected image portion with an altered image quality.

5. The method defined in claim 4, wherein the outputting step includes printing the images of the selected image portion and images of the non-selected image portion, wherein only the images of the selected image portion have an altered image quality.

6. The method defined in claim 1, wherein the selected image portion is one of inside the demarked boundaries or outside the demarked boundaries.

7. The method defined in claim 1, wherein the one or more hardcopy pages are selection sheets having selection/acquisition aids.

8. The method defined in claim 7 wherein the selection/acquisition aids include at least one of document images printed with increased brightness, document images printed with reduced contrast, and superimposed grid lines.

9. The method defined in claim 7, further comprising:
   scanning a hardcopy document to capture one or more images of the document; and
   printing the one or more selection sheets.

10. The method defined in claim 7, wherein the demarked boundaries are darker than the darkest portions of the selection sheets.

11. A method selectively scanning a desired image portion of a hardcopy document comprising:
    scanning a hardcopy document to capture one or more images of the document;
    printing one or more hardcopy page selection sheets including one or more images of the document and one or more selection/acquisition aids;
    demarking boundaries on the one or more hardcopy pages using a writing instrument to differentiate a selected image portion from a non-selected image portion;
    scanning the one or more demarked hardcopy pages with an image acquisition device;
    acquiring one or more images from the selected image portion; and
    processing the acquired images from the selected image portion to differentiate them from the non-selected image portion.

12. The method defined in claim 11, wherein the selected image portion is one of inside the demarked boundaries or outside the demarked boundaries.

13. The method defined in claim 11, wherein the one or more selection aids include at least one of document images printed with increased brightness, document images printed with reduced contrast, and superimposed grid lines.

14. An image acquisition device comprising:
    an image acquisition portion for acquiring one or more images from a hardcopy document page including a selected image portion, a non-selected image portion and boundaries demarked on the hardcopy document page; and
    a controller for determining the extent of the demarked boundaries and differentiating between the selected image portion and a non-selected image portion using the demarked boundaries, the controller processing the selected image portion differently than the non-selected image portion.

15. The image acquisition device defined in claim 14 wherein the hardcopy document page is a selection sheet including images from an original hardcopy document and selection/acquisition aids.

16. The image acquisition device defined in claim 15 wherein selection/acquisition aids include at least one of the original hardcopy document images printed with increased brightness, the original hardcopy document images printed with reduced contrast, and superimposed grid lines.

17. The image acquisition device defined in claim 14 further comprising memory for storing the selected image portion images in electronic form apart from the non-selected portion images.

18. The image acquisition device defined in claim 14 further comprising a printing device for printing the selected image portion images apart from the non-selected image portion images.

19. The image acquisition device defined in claim 14 further comprising a user interface for providing user supplied operating conditions including an indication that the selected image portion lies either inside of the boundaries or outside of the boundaries.

* * * * *